(12) United States Patent
Bowles et al.

(10) Patent No.: US 7,354,638 B2
(45) Date of Patent: Apr. 8, 2008

(54) POROUS WET FRICTION MATERIAL UTILIZING A COMPLIANT EPOXIDE RESIN BINDER SYSTEM

(75) Inventors: Laurie Bowles, Lafayette, IN (US); Samuel Truncone, Crawfordsville, IN (US); Wayne D. Woodson, Georgetown, IL (US); Wenping Zhao, Crawfordsville, IN (US)

(73) Assignee: Raytech Composites, Inc., Crawfordsville, IN (US)

( * ) Notice: Subject to any disclaimer, the term of this patent is extended or adjusted under 35 U.S.C. 154(b) by 216 days.

(21) Appl. No.: 11/330,829

(22) Filed: Jan. 12, 2006

(65) Prior Publication Data

US 2006/0115641 A1 Jun. 1, 2006

Related U.S. Application Data

(63) Continuation of application No. 10/755,612, filed on Jan. 12, 2004, now abandoned.

(60) Provisional application No. 60/439,875, filed on Jan. 14, 2003.

(51) Int. Cl.
*B32B 3/02* (2006.01)

(52) U.S. Cl. .................. 428/66.2; 428/297.4
(58) Field of Classification Search ............. 428/66.2, 428/297.4; 192/102 M, 107 M; 188/206 R, 188/215, 251 R; 523/149; 442/153, 156
See application file for complete search history.

(56) References Cited

U.S. PATENT DOCUMENTS

| | | | | |
|---|---|---|---|---|
| 5,083,650 A * | 1/1992 | Seiz et al. | ............. | 192/107 M |
| 6,316,083 B1 * | 11/2001 | Kawabata et al. | .......... | 428/212 |
| 6,586,373 B2 * | 7/2003 | Suzuki et al. | ................ | 508/101 |
| 6,667,103 B1 * | 12/2003 | Mori et al. | .................. | 428/447 |
| 6,667,104 B2 * | 12/2003 | Aiba et al. | ................... | 428/447 |
| 6,776,276 B2 * | 8/2004 | Okamura et al. | ...... | 192/107 M |
| 6,830,798 B2 * | 12/2004 | Bowles et al. | .............. | 428/111 |
| 7,074,887 B2 * | 7/2006 | Wang et al. | ................ | 528/422 |

* cited by examiner

*Primary Examiner*—N. Edwards
(74) *Attorney, Agent, or Firm*—Pyle & Piontek, LLC

(57) ABSTRACT

A wet friction material is disclosed bonded to a plate for transmission of motion, with the friction material made up of a porous fiber substrate, which is at least partially impregnated with a catalyzed resorcinol diglycidyl ether resin to improve properties.

29 Claims, No Drawings

POROUS WET FRICTION MATERIAL UTILIZING A COMPLIANT EPOXIDE RESIN BINDER SYSTEM

CROSS REFERENCE

The application is a continuation of application Ser. No. 10/755,612, filed Jan. 12, 2004 now abandoned, which in turn is a conversion of Provisional application No. 60/439,875 filed Jan. 14, 2003.

BACKGROUND OF THE INVENTION

The term "wet friction material" is well understood by those skilled in the art. These materials typically use a porous substrate comprising fibers such as wet laid cellulose and possible other additives. Rings of this substrate are typically mounted on each side of a ring-shaped metal support disk. The substrate is partially impregnated with a curable resin dissolved in a solvent with the resin most widely used being a phenol type. In a standard transmission or clutch, these members are mounted in an interleaved relation with bare metal reaction disks or plates, and the assembly can be moved in and out of engagement, for example, to provide a shifting or braking function in a vehicle. These assemblies run in lubricating liquids to provide, among other things, a cooling function.

In wet friction materials, it is desirable to have as high of a coefficient of friction as possible. Other desirable properties include durability and high energy capacity.

It is taught in the literature that softer, generally referring to lower modulus, binder/substrate systems, have higher friction coefficients. The compliancy of the system, the ability to conform to the reaction plate surface, maximizes surface contact during clutch engagement. This helps dissipate heat as well, reducing coning, hot-spotting, while improving durability.

Phenolic resin systems, in particular phenol formaldehyde—based resoles, are the predominate saturating resins used in the friction industry. Unmodified, these resins are brittle and have relatively high modulus. To lower modulus, improve fatigue resistance, and in general improve friction properties, these resin are modified, usually with elastomeric compounds such as nitrile or gum rubber. In addition, they may be made more "linear", hence more flexible, by using substituted phenols, such as cresol, in place of phenol, and/or acetaldehyde, propionaldehye, benzaldehyde, etc., in place of formaldehyde. However, even extensive modification does not fully overcome the inherent brittle nature of phenolic systems. There are both chemical and practical limitations, such as solution viscosity, which govern the possible extent of chemical modification of these systems.

THE INVENTION

We have discovered that resorcinol diglycidyl ether (RDGE), catalyzed with a lewis acid or base to promote homopolymerization, when used as a saturant or impregnating agent in a fiber substrate such as paper, imparts unique and greatly improved friction properties. Friction coefficients are approximately 40-50% higher, and energy capacity 40-50% higher than phenolic systems.

The resin can be cured either with lewis acid catalysts, such as boron trifluoride or boron trichloride complexes, or with a tertiary amine such as 2-ethyl, 4-methylimidazole (2,4-EMI) or tris-dimetlyaminomethyl phenol (DMP-30). It is important that the catalyzation be homocatalytic to impart the desirable linear geometry to the polymer. 2,4-EMI is the preferred catalyst.

In general, a high coefficient of friction is desirable because more torque can be transmitted to a transmission with a given friction surface area. This may allow design of transmission with fewer friction plates, saving weight and space. While most paper substrates and transmission fluids contain elements to modify friction coefficient, the RDGE binder provides additional performance benefits, as well as a dynamic coefficient of friction of 0.17 and greater.

The resin is dissolved in a solvent, such as methyl ethyl ketone (MEK). It could also be dissolved in other ketones such as methyl isobutyl ketone(MIBK), glycol ethers such as propylene glycol methyl ether (PGME), or mixtures of these with alcohols such as isopropyl alcohol (IPA). The resin is diluted in solvent to a solids level of from 35-50% depending on application. The curing agent is mixed into the solvent/epoxy solution, where it has a pot life of from several days to several weeks depending on storage temperature.

After saturation, the parts are "B" staged for 10 minutes at 250 F followed by 10 minutes at 400 F. The parts are then pressed to size with pressure and heat. If a post cure is required, the parts are post cured either prior to or after sizing. A typical post-cure would be 350 F for one hour. The material is typically in disk or ring shaped form.

The friction material is bonded to a rigid or steel backing member with adhesive. The friction material is essentially flat but may be provided with outwardly facing grooves as well know in the art.

The RDGE resin can be combined with other resins without undue sacrifice to performance, for example epoxy novolac and others. Preferably, the RDGE amounts to at least 60% of the total resin, and the resin has a purity of greater than 80%. The RDGE resins are available commercially.

The RDGE resin, as well as it's various modifications with the RDGE resin include epoxy novolacs, bisphenol-A epoxy, aliphatic and aromatic epoxide reactive diluents such as cresyl glycidyl ether or castor oil glycidyl ether, functionalized rubber compounds such as carboxy, amine, or epoxide terminated acrylonitrile rubber, thermoset compounds modified with these rubber compounds, and resole or novolac phenolic resins, all being thermoset resins, if necessary.

The paper base is a flat sheet of individual fibers, although other forms such as yarns, nonwovens, scrim, etc. could possibly be employed. The typical base utilizes cellulose fibers, which is deposited as pulp on a porous surface and dried. Various additional fibers added, as well as additives, such as friction modifiers or other agents to improve or alter performance. The paper sheet, of the desired uniform thickness, is dried using an oven or otherwise, and is then suitable for cutting into blanks prior to impregnation by the resin. These are standard process and well known to those skilled in the art.

The term "wet friction material" refers to a relatively thin fiber base impregnated by resin and bonded to a rigid or steel backing plate. These plates are arranged in alternating series with a relatively rotating steel reaction disk or plate to transfer power in the assembly running in oil or liquid lubricant, by nature of friction. Due to the extreme conditions of activation, engagement and disengagement, the friction material must possess, for example, good wear properties, thermal stability, compliance with the reaction plate, and the desired degree of friction coefficient without detriment to other essential properties.

EXAMPLE

An automatic transmission friction assembly was prepared. Raybestos 7049 production paper 0.023" thick was cut to size and bonded to both sides of a steel circular disk, under heat and pressure, with a phenolic adhesive. The assembly was then placed into a resin solution and the paper saturated, so that a resin pick-up of 55% (+or −5%) of the dry weight of the paper as described below was achieved. The assemblies were then run through a drying oven to remove solvent and partially cure, or "B" stage the resin. The parts were then pressed to final size, at 500 F under pressure, to 0.017" bonded paper thickness on each side, followed by an oven post-cure which was optimal for the resin system.

Three of these composite assemblies were then placed in a test assembly and tested in the SAE J2487 Test Procedure as described above.

DEFINITIONS 1. 7049 can be described as a wet—layed cellulose—base paper modified with diatomaceous earth and a latex binder. Midpoint Coefficient—The coefficient of friction taken from the midpoint of the Torque Curve.

2. SAE J2487—A stepped power level test. In this procedure, three doubled-sided friction assemblies are assembled in a clutch pack with steel reaction plates contacting each friction surface (four reaction plates). A transmission oil is specified. The assembly is accelerated to 3600 rpm, then stopped in 0.5 seconds by interaction of the friction surfaces with the reaction plates. At each subsequent test level, the inertia of the engagement is increased, thus requiring more force to stop the assembly in 0.5 seconds. Failure is determined when 1) the friction material fails, i.e., delaminating or tearing, or 2) when heat transfer results in coning (warping) of the reaction plates.

3. Epoxy Novolac—An epoxidized phenol-formaldehyde novolac resin, with an epoxide equivalent weight of 170, and viscosity of 30,000 centipoise @ 25 C.

4. CTBN Modified Bisphenol-F Epoxy Resin—An epoxidized phenol-formaldehyde novolac resin, with an epoxide equivalent weight of 165, and viscosity of 3200 cps @ 25 C, modified 20% with CTBN rubber.

5. 2,4-EMI—2-ethyl, 4-methylimidizole 6. 7049-H4—7049 paper saturated with a resin solution of: 80% RDGE, 10% epoxy novolac resin, and 10% CTBN modified Bisphenol-F epoxy resin, diluted to 35% solids in methyl Ethyl Ketone (MEK). Catalyst 2,4-EMI is added at 3% based on resin (BOR) weight.

7. 7049-H3—7049 paper saturated with a resin solution of: 70% RDGE, 20% epoxy novolac, and 10% CTBN modified Bisphenol F epoxy resin, diluted to 35% solids in MEK. 2,4-EMI is added at 3% BOR.

8. 7049-H2—7049 paper saturated with a resin solution of: 70% RDGE and 30% epoxy novolac resin, diluted to 35% solids in MEK. 2,4-EMI is added at 3% BOR.

9. 7049-H1—7049 paper saturated with a resin solution of: RDGE diluted to 35% solids in MEK. 2,4-EMI is added at 3% BOR.

10. 7049-P—7049 paper saturated with a production resole phenolic resin, diluted to 35% solids in ethanol. No catalyst is added.

11. Hmp—Midpoint Coefficient of Friction

12. Hep/Hmp—Endpoint Coefficient of Friction divided by Midpoint Coefficient of Friction (E/M) ratio.

13. Hbk—Breakaway Coefficient 14. mm—Wear in millimeters

7049-H1 was assembled, post cured 1 hour at 350 F, and evaluated as described above.

Example 2

7049-H2 was assembled, post cured 1 hour at 350 F, and evaluated as described above.

Example 3

7049-H3 was assembled, post cured 1 hour at 350 F, and evaluated as described above.

Example 4

7049-H4 was assembled, post cured 1 hour at 350 F, and evaluated as described above.

Comparative Example 5

7049-P was assembled, and evaluated as described above. No post cure was needed.

Results

The table below summarizes and compares performance of the example formulations at Test Level 5. Notice that the friction coefficient of 7049-H1 at that level is 52% higher than 7049-P. 7049-H1 ran to 11 levels vs 7 levels for 7049-P, demonstrating higher energy capacity. 7049-H1 also displays a lower E/M ratio. All of the epoxy formulations show significantly higher friction coefficients and energy capacity.

TABLE 1

Performance Comparison

| | LEVEL 5 @ CYCLE 200 | | | | Levels |
|---|---|---|---|---|---|
| Resin | Hmp | Hep/Hmp | Hbk | mm | Completed |
| 7049-H1 | 0.169 | 1.006 | 0.117 | 0.0965 | 11 |
| 7049-H2 | 0.166 | 1.054 | 0.119 | 0.0745 | 9 |
| 7049-H3 | 0.157 | 1.045 | 0.118 | 0.0948 | 10 |
| 7049-H4 | 0.173 | 1.012 | 0.119 | 0.0965 | 10 |
| 7049-P | 0.111 | 1.126 | 0.127 | 0.1465 | 7 |

Table 2 summarizes Storage Modulus and Glass Transition Temperature (Tg), determined by Dynamic Mechanical Analysis (DMA). The lower modulus of the epoxy systems translates into better conformity at operating temperature.

TABLE 2

Comparison of S Modulus and Tg

| Material | Modulus (Mpa) @ 150 C. | Tg ° C. |
|---|---|---|
| 7049-H1 | 500 | 130 |
| 7049-H2 | 750 | 145 |
| 7049-H3 | 450 | 135 |
| 7049-H4 | 400 | 130 |
| 7049-P | 1600 | >250 |

What is claimed is:

1. A wet friction material comprising a base containing fibers, and a resin at least partially impregnating said base, said resin having a Tg of 145° F. or less and comprising at least 60 percent of a catalyzed resorcinol diglycidyl ether, said resin having a purity of 80% or higher, said resin being catalyzed with one of a Lewis acid and Lewis base, with homopolymerization of said resin, said wet friction material having a coefficient of friction higher than a wet friction material of the same physical construction but based on a phenol resin.

2. The wet friction material of claim 1, wherein the resin is diluted in a solvent prior to application to the base, and the solvent is evaporated.

3. The wet friction material of claim 1, wherein the material is generally thermosetting.

4. The friction material of claim 1, wherein the base comprises cellulose fibers.

5. The friction material of claim 1, wherein the friction material is generally a flat disk, and a rigid flat plate adhered to the flat disk.

6. A wet friction material as in claim 1, wherein said wet friction material has a dynamic coefficient of friction greater than a wet friction material of the same physical construction but based on a phenol resin.

7. A wet friction material as in claim 1, wherein said wet friction material has a coefficient of friction about 40% or higher than a wet friction material of the same physical construction, but based on a phenol resin.

8. A wet friction material as in claim 7, wherein said wet friction material has a dynamic coefficient of friction about 40% or higher than a wet friction material of the same physical construction but based on a phenol resin.

9. A wet friction material as in claim 8, wherein said resin is diluted in a solvent prior to application to the base, and the solvent is evaporated, said wet friction material being generally thermosetting, said base comprising cellulose fibers.

10. A wet friction material as in claim 9, wherein the friction material is generally a flat disk, and a rigid flat plate adhere to the flat disk.

11. A wet friction material as in claim 1, wherein said resin is diluted in a solvent prior to application to the base, and the solvent is evaporated, said wet friction material being generally thermosetting, said base comprising cellulose fibers.

12. A wet friction material as in claim 11, wherein the friction material is generally a flat disk, and a rigid flat plate adhere to the flat disk.

13. A wet friction material as in claim 1, wherein said wet friction material has a coefficient of friction about 40% or higher than a wet friction material of the same physical construction but based on a phenol resin, and dynamic coefficient of friction about 40% or higher than a wet friction material of the same physical construction but based on a phenol resin, said resin being diluted in a solvent prior to application to the base, and the solvent is evaporated, said wet friction material being generally thermosetting, said base comprising cellulose fibers.

14. A wet friction material as in claim 13, wherein the friction material is generally a flat disk, and a rigid flat plate adhere to the flat disk.

15. A wet friction material as in claim 14, wherein said Tg is in a range of 130-145° F.

16. A wet friction material as in claim 1, wherein said Tg is in a range of 130-145° F.

17. The friction material as in claim 1, wherein said material is mounted on each side of one or more a ring shaped metal support disks, a plurality of said ring shaped metal support disks being interleaved in relation with bare metal reaction disks, said ring shaped metal support disks and said bare metal reaction disks being movable in and out of engagement and running in lubricating oil.

18. The friction material as in claim 17, which can conform to the bare metal reaction disks to maximize surface contact during engagement.

19. The friction material as in claim 1, having an energy capacity at least 40-50% higher than a wet friction material of the same physical construction but based on a phenol resin.

20. The friction material as in claim 19, wherein said comparison is made under the SAE J2487 stepped power level test.

21. The friction material as in claim 1, wherein the remainder of the resin may include another resin.

22. The friction material as in claim 21, comprising 70-80% RDGE and 30-10% epoxy Novolac resin.

23. The friction material as in claim 21, further comprising about 70% RDGE, about 20% epoxy novolac resin and about 10% CTBN.

24. A friction material as in claim 1, when tested under SAE J2487 completes more levels with less wear than a wet friction material of the same physical construction but based on a phenol resin.

25. A friction material as in claim 24, completing at least two levels more than a wet friction material of the same physical construction but based on a phenol resin.

26. A friction material as in claim 1, having 70% or less wear than a wet friction material of the same physical construction but based on a phenol resin.

27. A friction material as in claim 1, having a lower "S" (Storage Modulus) than a wet friction material of the same physical construction but based on a phenol resin.

28. A friction material as in claim 27, wherein said "S" (Storage Modulus) is less than about ½ to about ¼ of that of a wet friction material of the same physical construction but based on a phenol resin.

29. The friction material as in claim 1, wherein said material is mounted on each side of one or more a ring shaped metal support disks, a plurality of said ring shaped metal disks being interleaved in relation with bare metal reaction disks, said ring shaped metal support disks and said bare metal reaction disks being movable in and out of engagement and running in lubricating oil, said friction material can conform to the bare metal reaction disks to maximize surface contact during engagement, said friction material having an energy capacity at least 40-50% higher than a wet friction material of the same physical construction but based on a phenol resin, comparison being made under the SAE J2487 stepped power level test, said friction material includes another resin, said friction material tested under SAE J2487 completes more levels with less wear than a wet friction material of the same physical construction but based on a phenol resin, and at least two levels more than a wet friction material of the same physical construction but based on a phenol resin, 70% or less wear than a wet friction material of the same physical construction but based on a phenol resin, a lower "S" (Storage Modulus) than a wet friction material of the same physical construction but based on a phenol resin, said "S" (Storage Modulus) is about ½ to about ¼ of that of a wet friction material of the same physical construction but based on a phenol resin.

* * * * *